United States Patent
Seo

(10) Patent No.: US 11,256,441 B2
(45) Date of Patent: Feb. 22, 2022

(54) SEMICONDUCTOR SYSTEM AND METHOD FOR OPERATING SEMICONDUCTOR SYSTEM FOR REDUCING TIME TO PERFORM INITIALIZATION OF A UNIVERSAL FLASH STORAGE (UFS) HOST

(71) Applicant: SAMSUNG ELECTRONICS CO., LTD., Suwon-si (KR)

(72) Inventor: Hyun-Seung Seo, Goyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 24 days.

(21) Appl. No.: 16/795,110

(22) Filed: Feb. 19, 2020

(65) Prior Publication Data

US 2021/0004176 A1 Jan. 7, 2021

(30) Foreign Application Priority Data

Jul. 3, 2019 (KR) .................. 10-2019-0079908

(51) Int. Cl.
*G06F 3/06* (2006.01)
(52) U.S. Cl.
CPC .......... *G06F 3/0655* (2013.01); *G06F 3/0604* (2013.01); *G06F 3/0625* (2013.01); *G06F 3/0679* (2013.01)
(58) Field of Classification Search
CPC .... G06F 13/102; G06F 3/0604; G06F 3/0625; G06F 3/0634; G06F 3/0655; G06F 3/0659; G06F 3/0679
See application file for complete search history.

(56) References Cited

U.S. PATENT DOCUMENTS

| | | | |
|---|---|---|---|
| 6,851,012 B2 | 2/2005 | Yamashima | |
| 7,640,425 B2 | 12/2009 | Kasuga | |
| 10,114,655 B2 | 10/2018 | Li et al. | |
| 2004/0230850 A1* | 11/2004 | Baumgartner | G06F 1/324 713/320 |
| 2010/0275046 A1* | 10/2010 | Shimazaki | G06F 1/3203 713/323 |
| 2014/0068302 A1* | 3/2014 | Falik | G06F 1/3206 713/323 |
| 2015/0355914 A1 | 12/2015 | Yamamoto | |
| 2018/0136853 A1* | 5/2018 | Choi | G06F 3/0679 |
| 2018/0137896 A1 | 5/2018 | Shin et al. | |
| 2019/0034106 A1* | 1/2019 | Shin | G06F 13/1668 |

FOREIGN PATENT DOCUMENTS

| | | | |
|---|---|---|---|
| JP | 2003-84981 A | 3/2003 | |
| KR | 10-0994723 B1 | 11/2010 | |

* cited by examiner

*Primary Examiner* — Jane Wei
(74) *Attorney, Agent, or Firm* — Sughrue Mion, PLLC

(57) ABSTRACT

Provided is a semiconductor system. The semiconductor system includes a universal flash storage (UFS) host, including a host controller interface, a UniPro and a M-PHY; a UFS device configured to exchange data with the UFS host through a UFS interface; and an application processor configured to control the UFS host. The UFS device is configured to maintain a power-on status when the application processor operates in a suspend mode.

18 Claims, 6 Drawing Sheets

SEMICONDUCTOR SYSTEM AND METHOD FOR OPERATING SEMICONDUCTOR SYSTEM FOR REDUCING TIME TO PERFORM INITIALIZATION OF A UNIVERSAL FLASH STORAGE (UFS) HOST

CROSS-REFERENCE TO THE RELATED APPLICATION

This application claims priority from Korean Patent Application No. 10-2019-0079908, filed on Jul. 3, 2019, in the Korean Intellectual Property Office, the disclosure of which is incorporated herein by reference in its entirety.

BACKGROUND

1. Field

One or more example embodiments of the disclosure relate to a semiconductor system and a method for operating the semiconductor system.

2. Description of the Related Art

When an application processor that controls a universal flash storage (UFS) host enters a suspend mode, a power supply of a UFS device is turned off, and the UFS device loses setting values and information exchanged with a UFS host at the time of Linkstartup. As a result, when the application processor exits the suspend mode, the UFS host needs to perform the Linkstartup task again. However, since the Linkstartup task proceeds at a relatively slow rate, it is desirable to reduce the time required to re-establish a connection between the UFS host and the UFS device when the application processor exits the suspend mode.

SUMMARY

One or more example embodiments of the disclosure provide a semiconductor system and a method for operating the semiconductor system that are capable of reducing a time to perform initialization of a universal flash storage (UFS) host so that the connection between the UFS host and a UFS device can be quickly established when an application processor that controls the UFS host exits a suspend mode.

It should be noted that aspects of the disclosure are not restricted to those set forth herein. The above and other aspects of the disclosure will become more apparent to one of ordinary skill in the art to which the disclosure pertains by referencing the detailed description of the disclosure given below.

According to an aspect of an example embodiment the disclosure, there is provided a semiconductor system comprising a UFS host comprising a host controller interface, a UniPro and a M-PHY; a UFS device configured to exchange data with the UFS host through a UFS interface; and an application processor configured to control the UFS host. The UFS device is configured to maintain a power-on status when the application processor operates in a suspend mode.

According to an aspect of an example embodiment of the disclosure, there is provided a semiconductor system comprising a universal flash storage (UFS) host, the UFS host comprising a host controller interface, a UniPro and a M-PHY; a UFS device configured to exchange data with the UFS host through a UFS interface; and an application processor which controls the UFS host. The UFS device is configured to maintain a power-on status when the UFS host is in a power-off status.

According to an aspect of an example embodiment of the disclosure, there is provided a method for operating a semiconductor system, the method comprising storing, by an application processor, at least one of a setting value or status information relating to at least one of a host controller interface, a UniPro, or a M-PHY of a universal flash storage (UFS) host; entering, by the UFS device, a hibernation mode; controlling, by the application processor, the UFS host to enter a suspend mode; exiting, by the application processor, the suspend mode; restoring, by the application processor, the at least one of the setting value or the status information relating to the at least one of the host controller interface, the UniPro, or the M-PHY of the UFS host; and exiting, by the UFS device, the hibernation mode.

BRIEF DESCRIPTION OF THE DRAWINGS

The above and other aspects and features of the disclosure will become more apparent by describing in detail example embodiments thereof with reference to the attached drawings, in which.

DETAILED DESCRIPTION

Hereinafter, various example embodiments of the disclosure will be described with reference to the accompanying drawings.

Figure 1:
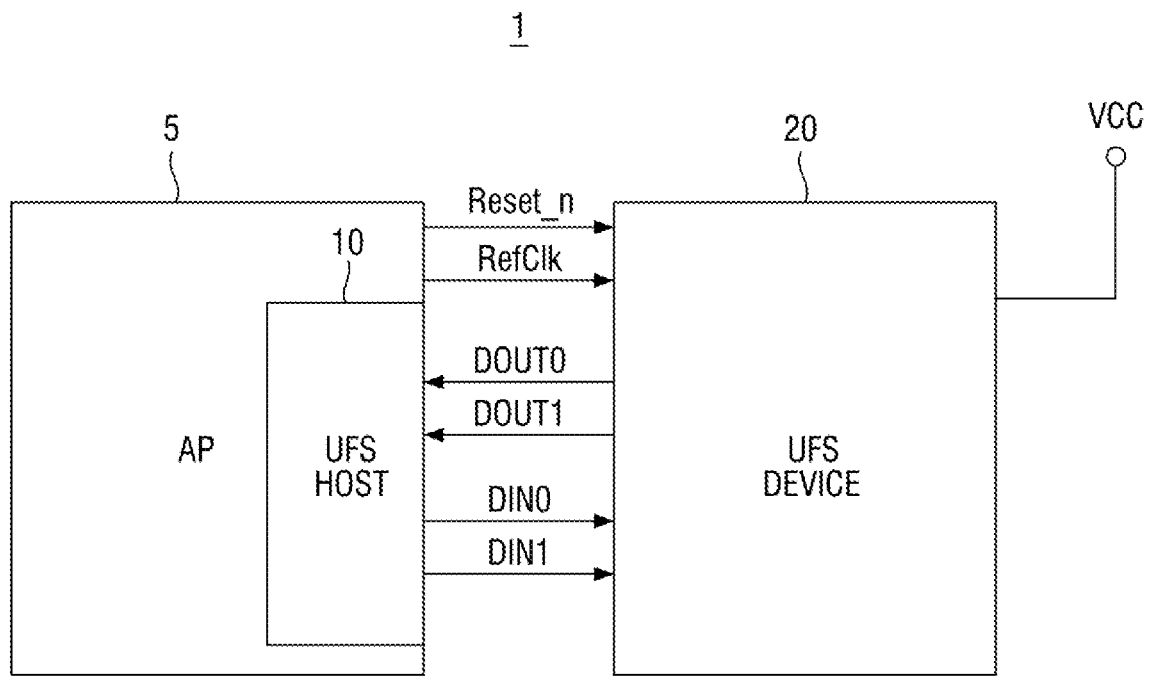
FIG. 1 is a diagram for explaining a semiconductor system according to an example embodiment of the disclosure.
Figure 2:
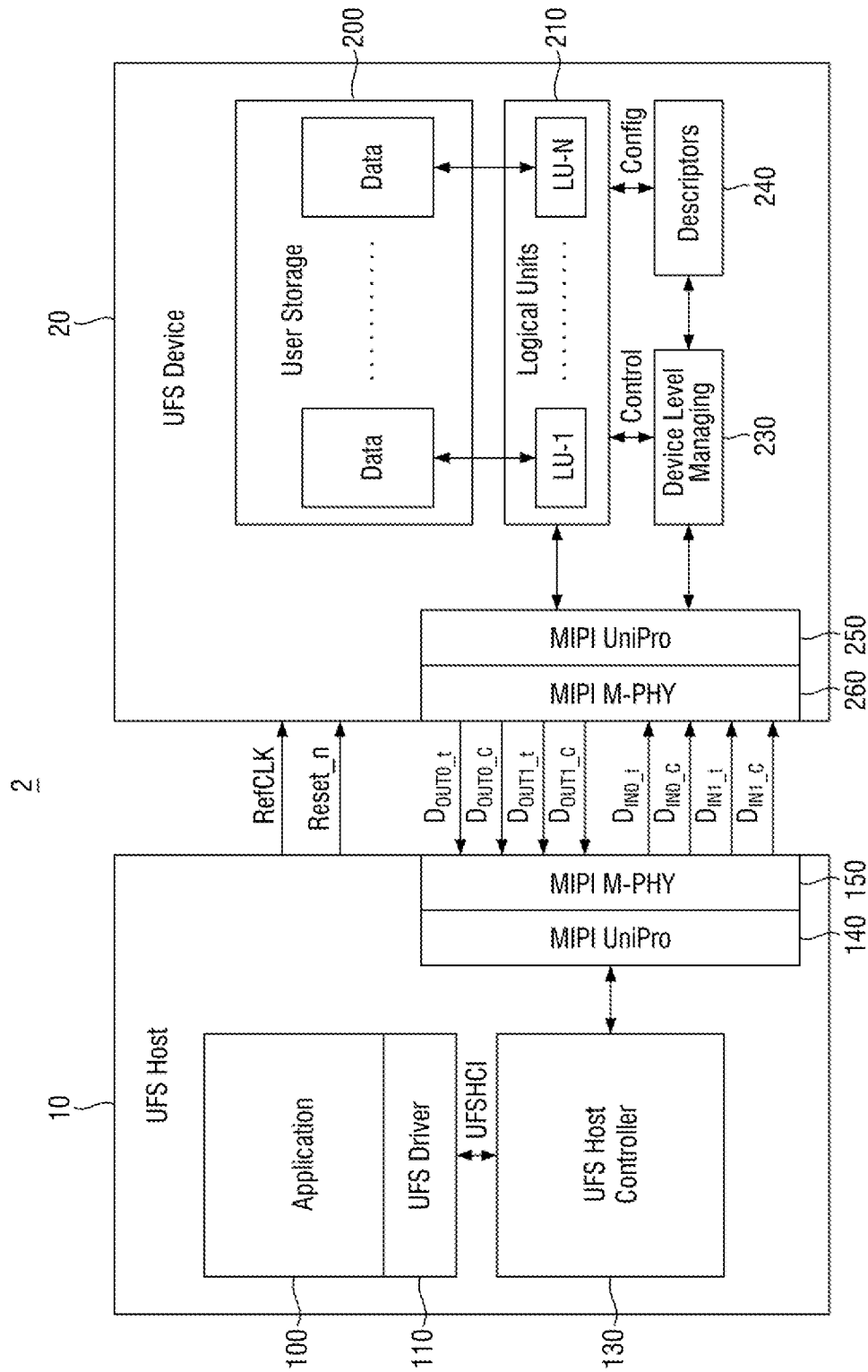
FIG. 2 is a diagram for explaining a semiconductor system according to an example embodiment of the disclosure.

FIG. 1 is a diagram for explaining a semiconductor system according to an example embodiment of the disclosure. FIG. 2 is a diagram for explaining the semiconductor system according to an example embodiment of the disclosure.

Referring to FIG. 1, a semiconductor system 1 according to an example embodiment of the disclosure includes an application processor 5, a universal flash storage (UFS) host 10, and a UFS device 20.

The application processor 5 may control the UFS host 10 to store data in the UFS device 20 or may read data from the UFS device 20. To this end, the application processor 5 may provide a reset signal Reset_n and a reference clock signal RefClk to the UFS device 20.

The UFS host 10 may store data on the UFS device 20 in response to a request of the application processor 5, and may read data from the UFS device 20 and provide the data to the application processor 5 in response to the request of the application processor 5. The UFS host 10 may be connected to the UFS device 20 through a universal flash storage (UFS) interface.

For example, the UFS host 10 may transmit data to the UFS device 20 through data lines DIN0, DIN1. On the other hand, the UFS host 10 may receive data from the UFS device 20 through data lines DOUT0, DOUT1. The data lines DIN0, DIN1 and the data lines DOUT0, DOUT1 may be implemented by differential signal lines, respectively.

Figure 3:
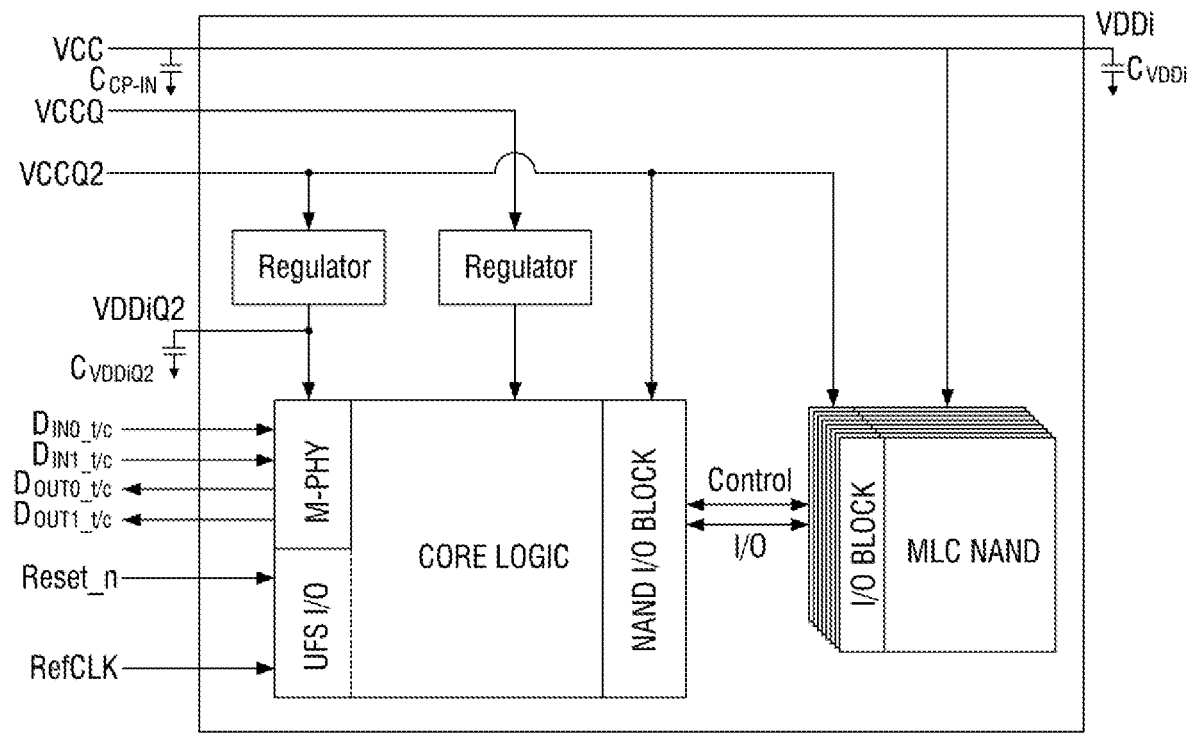
FIG. 3 is a diagram for explaining an operation of a UFS device according to an example embodiment of the disclosure.

The UFS device 20 may receive a power supply VCC separately from the UFS host 10, and may maintain a power-on status by the power supply VCC. Although only the VCC is shown in the drawing as the power supply to be provided to the UFS device 20, this is only an example for simplification of the description, and the example embodiments are not limited thereto. In some embodiments, power supplies of various forms other than the VCC may be provided to the UFS device 20. For example, a VCCQ, a VCCQ2, and/or the VCC may be provided to the UFS device 20 as the power supply. Also, as shown in FIG. 3, a variety of power supplies may be provided to the UFS device 20.

The application processor 5 may operate in various power modes. For example, the application processor 5 may operate in a suspend mode to reduce power consumption. For example, when the user does not use a device driven by the application processor 5 for a certain period of time, the application processor 5 may reduce wasteful power consumption by switching the operation mode into the suspend mode.

However, in the related art, when the application processor 5 enters the suspend mode, the power supply VCC of the UFS device 20 is turned off, and the UFS device 20 may lose setting values and information exchanged with the UFS host 10. The setting values and information mentioned here refer to setting values and information exchanged between the UFS host 10 and the UFS device 20 each other through a Linkstartup task among initialization tasks for establishing the connection between the UFS host 10 and the UFS device 20 through a UFS interface.

Therefore, when the application processor 5 exits the suspend mode, the UFS host 10 needs to exchange the setting values and information with the UFS device 20 again. Accordingly, the UFS host 10 and the UFS device 20 need to perform the Linkstartup task, and need to perform a Power Mode Change task again.

However, the Linkstartup task and the Power Mode Change task are performed at a relatively low speed of about 3 Mbps to 9 Mbps. On the other hand, the UFS host 10 and the UFS device 20 are capable of exchanging data at a relatively high speed from 12 Gbps (6 Gbps per lane) to 24 Gbps (12 Gbps per lane) through the UFS interface after the Power Mode Change task is performed.

Therefore, in a case in which the UFS device 20 is maintained in the power-on status while the application processor 5 operates in the suspend mode, when the application processor 5 exits the suspend mode, it is possible to reduce the time required to re-establish the connection between the UFS host 10 and the UFS device 20 and to quickly establish the connection between the UFS host 10 and the UFS device 20.

In some embodiments of the disclosure, the semiconductor system 1 may further include a buffer memory. The buffer memory may be used as a main memory of the UFS host 10, or may be used as a cache memory, a temporary memory or the like for temporarily storing the data. In some embodiments of the disclosure, although the buffer memory may include a volatile memory including a dynamic random access memory (DRAM), the scope of the disclosure is not limited thereto.

Referring to FIG. 2, a semiconductor system 2 according to an example embodiment of the disclosure includes a UFS host 10 and a UFS device 20. FIG. 2 shows the UFS host 10 and the UFS device 20 described in FIG. 1 in more detail.

Specifically, the UFS host 10 includes an application 100, a UFS driver 110, a UFS host controller interface 130, a UFS host UniPro 140, and a UFS host M-PHY 150.

The application 100 may control the semiconductor system 2, based on a set of commands that is executed on the UFS host 10 and may be used in the semiconductor system 2.

The UFS driver 110 may drive the UFS device 20 connected to the UFS host 10. Specifically, the UFS driver 110 may receive a command for controlling the UFS device 20 from the application 100, process the command using the UFS host controller interface 130, and may provide a processing result thereof to the application 100.

While the application 100 and the UFS driver 110 may be implemented by software according to some embodiments, the scope of the disclosure is not limited thereto.

The UFS host controller interface 130 controls overall operations within the UFS host 10. For example, the UFS host controller interface 130 may transmit data stored in the buffer memory to the UFS device 20 through the UFS host UniPro 140 and the UFS host M-PHY 150 in response to a write command received from the UFS driver 110. In addition, the UFS host controller interface 130 may also receive the data from the UFS device 20 through the UFS host UniPro 140 and the UFS host M-PHY 150 in response to the read command received from the UFS driver 110.

The UFS host UniPro 140 and the UFS host M-PHY 150 exchange data with a UFS device UniPro 250 and a UFS device M-PHY 260 of the UFS device 20, which will be described below, through data lines DIN, DOUT.

Other detailed contents of the application 100, the UFS driver 110, the UFS host controller interface 130, the UFS host UniPro 140 and the UFS host M-PHY 150 of the UFS host 10 are known in a UFS specification, and thus, the description thereof will not be provided herein.

The UFS device 20 includes a user storage 200, a logic unit 210, a device level management unit 230, a descriptor 240, the UFS device UniPro 250, and the UFS device M-PHY 260.

Although the user storage 200 may include a flash memory, a magnetoresistive random access memory (MRAM), a phase-change random access memory (PRAM), a ferroelectric random access memory (FeRAM) and the like, the scope of the disclosure is not limited thereto.

The logic unit 210, the device level management unit 230, and the descriptor 240 control the overall operations within the UFS device 20. For example, the logic unit 210, the device level management unit 230, and the descriptor 240 may perform tasks of writing, reading and/or erasing data requested by the UFS host 10 on the user storage 200. To this end, like the UFS host 10, the UFS device 20 may further include a buffer memory.

Other detailed contents of the user storage 200, the logic unit 210, the device level management unit 230, the descriptor 240, the UFS device UniPro 250 and the UFS device M-PHY 260 of the UFS device 20 are known in the UFS specification, and thus, the description thereof will not be provided in this specification.

FIG. 3 is a diagram for explaining an operation of a UFS device according to an example embodiment of the disclosure.

Referring to FIGS. 1 and 3, the UFS device 20 of the semiconductor system according to an example embodiment of the disclosure includes a UFS I/O that receives a reset signal Reset_n and a reference clock signal RefClk from the application processor 5, a M-PHY which exchanges data with the UFS host 10, and a NAND I/O BLOCK which provides an interface with a MLC NAND, and includes a core logic which generally controls the UFS I/O, the M-PHY, the NAND I/O BLOCK and the like.

As shown in FIG. 3, electric power may be provided to the above elements of the UFS device 20 through one or more power supplies VCC, VCCQ, VCCQ2, VDDi, VDDiQ2, and the like.

In some embodiments according to the disclosure, the UFS device 20 maintains a power-on status, while the application processor 5 operates in the suspend mode.

That is, in some embodiments, while the application processor 5 operates in the suspend mode, the UFS device 20 operates in a hibernation mode. Specifically, before the application processor 5 enters the suspend mode, the UFS device 20 may enter the hibernation mode. Before the UFS device 20 enters the hibernation mode, the application processor 5 may store at least one of a setting value or status information in the host controller interface, the UniPro and the M-PHY of the UFS host 10.

Further, in some embodiments, while the application processor 5 operates in the suspend mode, the application processor 5 may provide the reference clock signal RefClk to the UFS device 20. In some embodiments, the application processor 5 may provide the reference clock signal RefClk to the UFS device 20 before the UFS device 20 enters the hibernation mode, and the application processor 5 may not provide the reference clock signal RefClk to the UFS device 20 while the UFS device 20 enters in the hibernation mode. In some embodiments, the application processor 5 may provide the reference clock signal RefClk to the UFS device 20 before the UFS device 20 exits the hibernation mode.

On the other hand, while the application processor 5 operates in the suspend mode, the application processor 5 continues to provide the reset signal Reset_n to the UFS device 20.

Further, in response to the application processor 5 exiting the suspend mode, the UFS device 20 exits the hibernation mode. Specifically, before the UFS device 20 exits the hibernation mode, the application processor 5 restores the at least one of the setting value or the status information relating to at least one of the host controller interface, the UniPro, or the M-PHY of the UFS host 10.

Accordingly, in response to the application processor 5 exiting the suspend mode, the UFS host 10 does not need to perform the UFS Linkstartup task, that is, the UFS host 10 skips the UFS Linkstartup task.

In addition, in response to the application processor 5 exiting the suspend mode, the UFS host 10 does not need to perform the UFS Power Mode Change task, that is, the UFS host 10 skips the UFS Power Mode Change task.

On the other hand, in some embodiments according to the disclosure, the UFS device 20 maintains a power-on status, while the UFS host 10 is in a power-off status.

That is, while the UFS host 10 is in the power-off status, the UFS device 20 operates in the hibernation mode. Specifically, before the UFS host 10 shifts to the power-off status, the UFS device 20 enters the hibernation mode. Before the UFS device 20 enters the hibernation mode, the application processor 5 stores the at least one of the setting value or the status information in the host controller interface, the UniPro and the M-PHY of the UFS host 10.

Further, in some embodiments, while the UFS host 10 is in the power-off status, the application processor 5 may provide the reference clock signal RefClk to the UFS device 20. In some embodiments, the application processor 5 provides the reference clock signal RefClk to the UFS device 20 before the UFS device 20 enters the hibernation mode, and the application processor 5 may not provide the reference clock signal RefClk to the UFS device 20 while the UFS device 20 operates in the hibernation mode. In some embodiments, the application processor 5 may provide the reference clock signal RefClk to the UFS device 20 before the UFS device 20 exits the hibernation mode.

On the other hand, while the UFS host 10 is in the power-off status, the application processor 5 continues to provide the reset signal Reset_n to the UFS device 20.

Further, in response to a shift of the UFS host 10 to the power-on status, the UFS device 20 exits the hibernation mode. Specifically, before the UFS device 20 exits the hibernation mode, the application processor 5 restores the at least one of the setting value or the status information relating to at least one of the host controller interface, the UniPro, or the M-PHY of the UFS host 10.

As a result, in response to a shift of the UFS host 10 to the power-on status, the UFS host 10 does not need to perform the UFS Linkstartup task.

In addition, in response to a shift of the UFS host 10 to the power-on status, the UFS host 10 does not need to perform the UFS Power Mode Change task.

Figure 4:
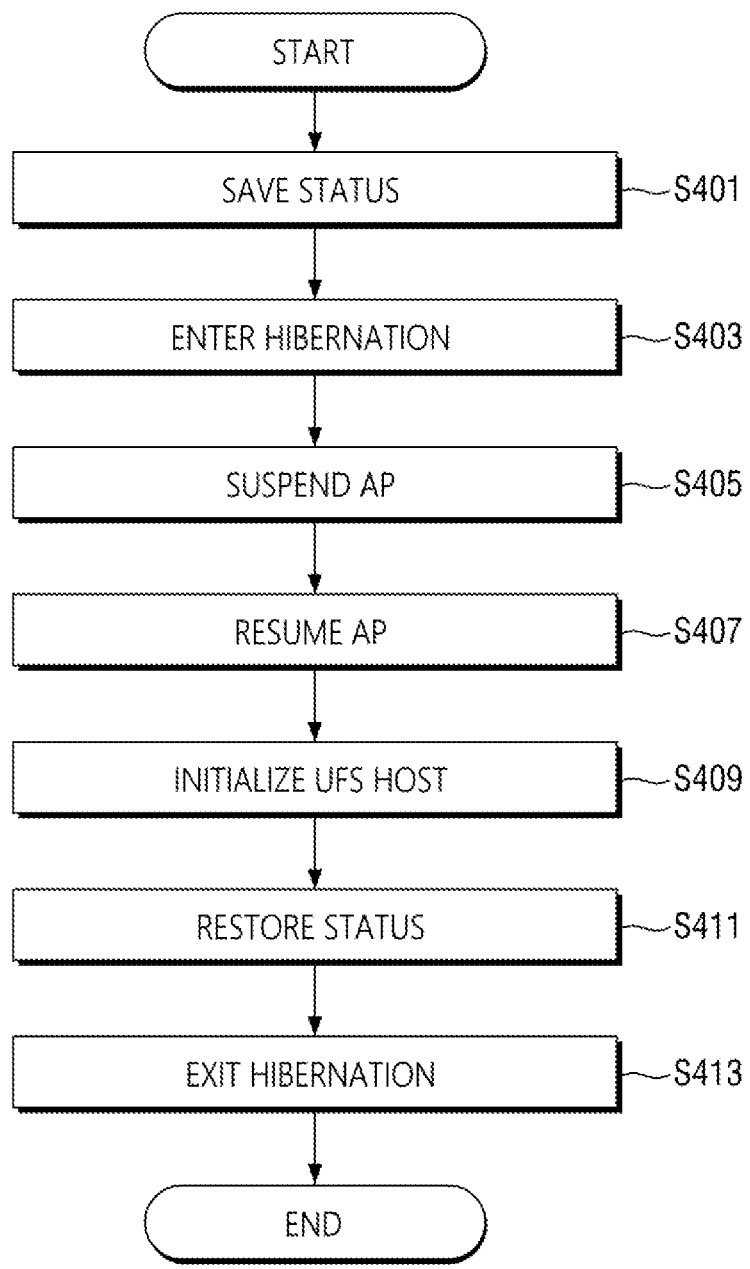
FIG. 4 is a diagram for explaining a method for operating a semiconductor system according to an example embodiment of the disclosure.

FIG. 4 is a diagram for explaining a method for operating a semiconductor system according to an example embodiment of the disclosure.

Referring to FIG. 4, the method for operating the semiconductor system according to an example embodiment of the disclosure includes storing the at least one of the setting value or the status information relating to at least one of the host controller interface, the UniPro, or the M-PHY of the UFS host 10 (S401).

The method also includes causing the UFS device 20 to enter the hibernation mode (S403).

The method also includes causing the application processor 5 for controlling the UFS host 10 to enter a suspend mode (S405).

The method also includes causing the application processor 5 to exit the suspend mode (S407).

The method also includes initializing the UFS host 10 (S409).

The method also includes restoring the at least one of the setting value or the status information relating to at least one of the host controller interface, the UniPro, or the M-PHY of the UFS host 10 (S411).

The method also includes causing the UFS device 20 to exit the hibernation mode (S413).

That is, while the application processor 5 operates in the suspend mode, the UFS device 20 may operate in the hibernation mode.

In some embodiments, the application processor 5 may provide a reference clock signal RefClk to the UFS device 20 while the application processor 5 operates in the suspend mode. In some embodiments, the application processor 5 provides the reference clock signal RefClk to the UFS device 20 before entering the hibernation mode, and the application processor 5 may not provide the reference clock signal RefClk to the UFS device 20 while the UFS device 20 operates in the hibernation mode. In some embodiments, the application processor 5 may provide the reference clock signal RefClk to the UFS device 20 before the UFS device 20 exits the hibernation mode.

On the other hand, while the application processor 5 operates in the suspend mode, the application processor 5 may continue to provide the reset signal Reset_n to the UFS device 20.

As a result, in response to the application processor 5 exiting the suspend mode, the UFS host 10 does not perform the UFS Linkstartup task, that is, the UFS host 10 skips the UFS Linkstartup task.

In addition, in response to the application processor 5 exiting the suspend mode, the UFS host 10 does not execute the UFS Power Mode Change task, that is, the UFS host 10 skips the UFS Power Mode Change task.

Figure 5:
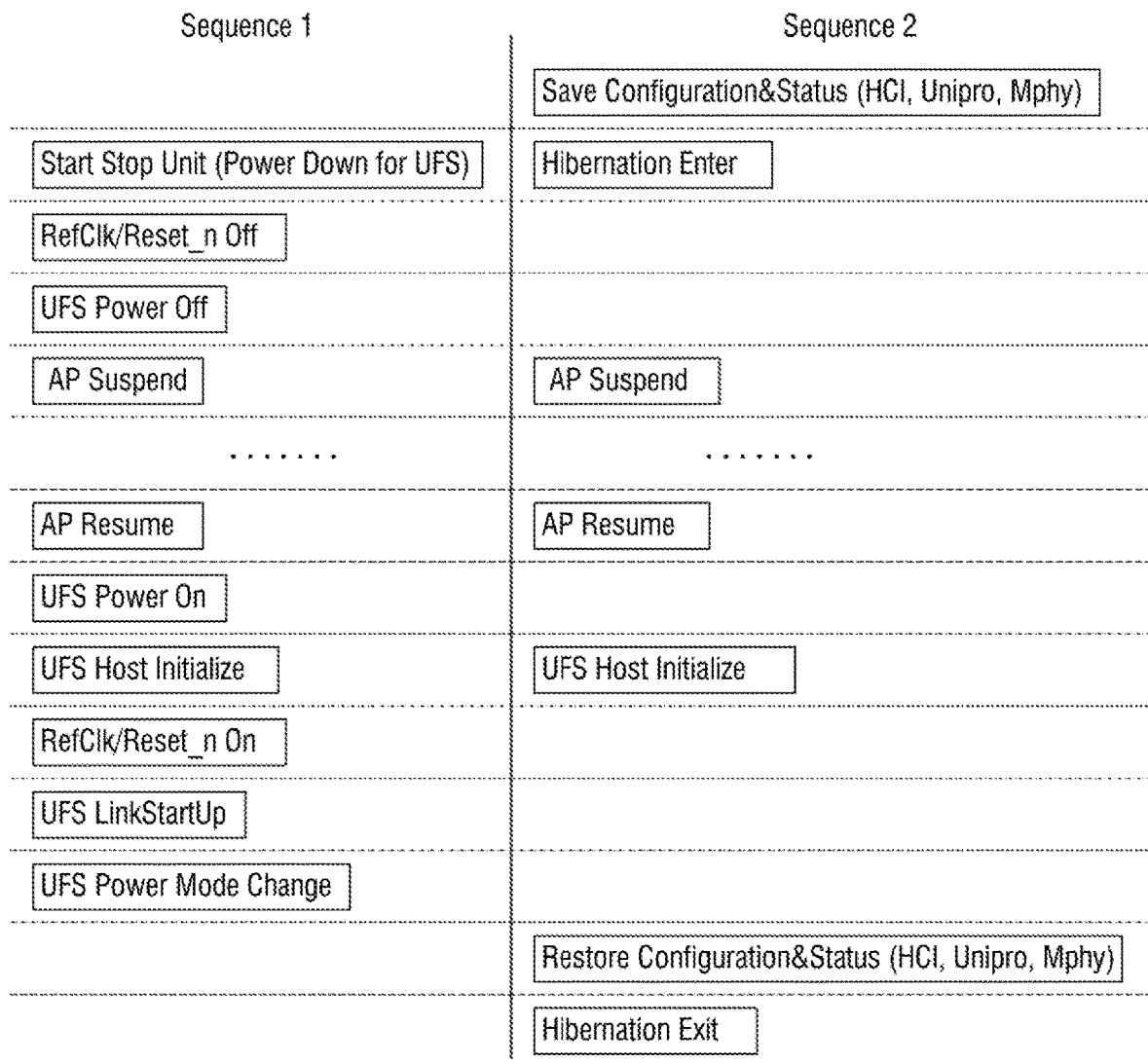
FIG. 5 is a diagram for explaining a method for operating a semiconductor system according to an example embodiment of the disclosure.
Figure 6:
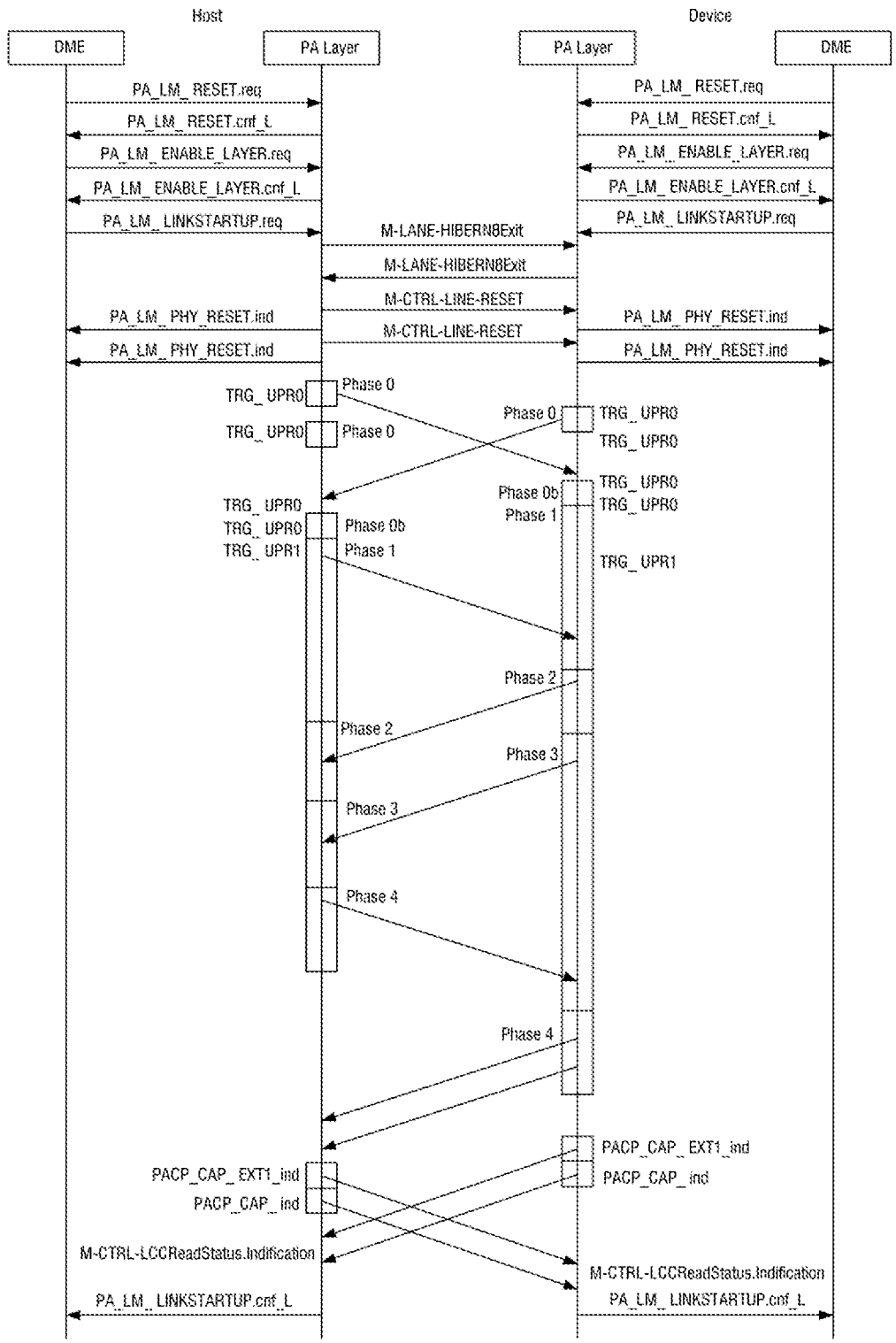
FIG. 6 is a diagram for explaining a comparative example in which a universal flash storage (UFS) Linkstartup task is performed in comparison with a semiconductor system and a method for operating the semiconductor system according to an example embodiment of the disclosure.

FIG. 5 is a diagram for explaining a method for operating a semiconductor system according to an example embodiment of the disclosure. FIG. 6 is a diagram for explaining a comparative example in which a universal flash storage (UFS) Linkstartup task is performed in comparison with a semiconductor system and a method for operating the semiconductor system according to an example embodiment of the disclosure.

In FIG. 5, "Sequence 1" indicates a comparative case in which the UFS device does not maintain the power-on status while the application processor 5 operates in the suspend mode. "Sequence 2" indicates a case in which the UFS device remains in a power-on status while the application processor 5 operates in the suspend mode according to an example embodiment.

FIG. 6 is a diagram specifically showing operations of performing the UFS Linkstartup task.

As it can be seen from FIGS. 5 and 6, when performing the suspend mode and resume of the application processor 5 in accordance with "Sequence 1", the UFS Linkstartup task and the UFS Power Mode Change task need to be performed after the application processor 5 exits the suspend mode. However, the UFS Linkstartup task is a time-consuming task that requires a large number of data exchanges between the UFS host 10 and the UFS device 20, thereby delaying establishment of connection between the UFS host 10 and the UFS device 20.

According to an example embodiment, the suspend and the resume of the application processor 5 are performed in accordance with "Sequence 2", in which the UFS device 20 is maintained in the power-on status while the application processor 5 operates in the suspend mode. Therefore, it is possible to reduce the time required to re-establish the connection between the UFS host 10 and the UFS device 20, and to quickly establish the connection between the UFS host 10 and the UFS device 20.

At least one of the components, elements, modules or units described herein may be embodied as various numbers of hardware, software and/or firmware structures that execute respective functions described above, according to an example embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the block diagrams, communication between the components, elements or units may be performed through the bus. Functional aspects of the above example embodiments may be implemented in algorithms that execute on one or more processors. Furthermore, the components, elements or units represented by a block or processing steps may employ any number of related art techniques for electronics configuration, signal processing and/or control, data processing and the like.

While a few example embodiments have been described above, the scope of the disclosure is not limited thereto and various modifications and improvements made by those of ordinary skill in the art to concepts defined in the following claims should be understood to fall within the scope of the disclosure.

What is claimed is:

1. A semiconductor system, comprising:
a universal flash storage (UFS) host comprising a host controller interface, a Unified Protocol (UniPro) interface and a M-PHY interface;
a UFS device configured to exchange data with the UFS host through a UFS interface; and
an application processor configured to control the UFS host,
wherein the UFS device is configured to maintain a power-on status when the application processor operates in a suspend mode, and
wherein after the application processor exits the suspend mode, the UFS host is configured not to perform a UFS Linkstartup task.

2. The semiconductor system of claim 1, wherein the UFS device is configured to operate in a hibernation mode when the application processor operates in the suspend mode.

3. The semiconductor system of claim 2, wherein the application processor is configured to provide a reference clock signal to the UFS device before the UFS device enters the hibernation mode, and the application processor is configured not to provide the reference clock signal to the UFS device when the UFS device operates in the hibernation mode.

4. The semiconductor system of claim 2, wherein the application processor is configured to provide a reset signal to the UFS device when the application processor operates in the suspend mode.

5. The semiconductor system of claim 2, wherein before the application processor enters the suspend mode, the UFS device is configured to enter the hibernation mode.

6. The semiconductor system of claim 5, wherein before the UFS device enters the hibernation mode, the application processor is configured to store at least one of a setting value or status information relating to at least one of the host controller interface, the Unified Protocol (UniPro) interface, or the M-PHY interface of the UFS host.

7. The semiconductor system of claim 2, wherein after the application processor exits the suspend mode, the UFS device is configured to exit the hibernation mode.

8. The semiconductor system of claim 7, wherein before the UFS device exits the hibernation mode, the application processor is configured to restore at least one of a setting value or status information relating to the at least one of the host controller interface, the Unified Protocol (UniPro) interface, or the M-PHY interface of the UFS host.

9. The semiconductor system of claim 1, wherein after the application processor exits the suspend mode, the UFS host is further configured not to perform a UFS Power Mode Change task.

10. A semiconductor system, comprising:
a universal flash storage (UFS) host comprising a host controller interface, a Unified Protocol (UniPro) interface and a M-PHY interface;
a UFS device configured to exchange data with the UFS host through a UFS interface; and
an application processor configured to control the UFS host,
wherein the UFS device is configured to maintain a power-on status when the UFS host is in a power-off status.

11. The semiconductor system of claim 10, wherein the UFS device is configured to operate in a hibernation mode when the UFS host is in the power-off status.

12. The semiconductor system of claim 11, wherein the application processor is configured to provide a reference clock signal to the UFS device before the UFS device enters the hibernation mode, and the application processor is configured not to provide the reference clock signal to the UFS device when the UFS device operates in the hibernation mode.

13. The semiconductor system of claim 11, wherein when the UFS host is in the power-off status, the application processor is configured to provide a reset signal to the UFS device.

14. A method for operating a semiconductor system, the method comprising:
storing, by an application processor, at least one of a setting value or status information relating to at least one of a host controller interface, a Unified Protocol (UniPro) interface or a M-PHY interface of a universal flash storage (UFS) host;
entering, by an UFS device, a hibernation mode;
controlling, by the application processor, the UFS host to enter a suspend mode;
exiting, by the application processor, the suspend mode;
restoring, by the application processor, the at least one of the setting value or the status information relating to the at least one of the host controller interface, the Unified Protocol (UniPro) interface or the M-PHY interface of the UFS host; and
exiting, by the UFS device, the hibernation mode,
wherein after the application processor exits the suspend mode, the UFS host is configured not to perform a UFS Linkstartup task.

15. The method for operating the semiconductor system of claim 14, wherein the UFS device is configured to operate in the hibernation mode when the application processor operates in the suspend mode.

16. The method for operating the semiconductor system of claim 15, wherein the application processor is configured to provide a reference clock signal to the UFS device before the UFS device enters the hibernation mode, and the application processor is configured not to provide the reference clock signal to the UFS device when the UFS device operates in the hibernation mode.

17. The method for operating the semiconductor system of claim 15, wherein the application processor is configured to provide a reset signal to the UFS device.

18. The method for operating the semiconductor system of claim 14, wherein after the application processor exits the suspend mode, the UFS host is further configured not to perform a UFS Power Mode Change task.

* * * * *